(12) United States Patent
Furuya

(10) Patent No.: US 9,989,714 B2
(45) Date of Patent: Jun. 5, 2018

(54) CONNECTING OPTICAL PART, OPTICAL PROCESSING APPARATUS, METHODS FOR FABRICATING CONNECTING OPTICAL PART, METHOD FOR FABRICATING GUIDE MEMBER PRODUCT

(71) Applicant: SUMITOMO ELECTRIC INDUSTRIES, LTD., Osaka (JP)

(72) Inventor: Akira Furuya, Yokohama (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days. days.

(21) Appl. No.: 15/284,321

(22) Filed: Oct. 3, 2016

(65) Prior Publication Data
US 2017/0097482 A1    Apr. 6, 2017

(30) Foreign Application Priority Data
Oct. 5, 2015    (JP) ................... 2015-197788

(51) Int. Cl.
| G02B 6/12 | (2006.01) |
| G02B 6/42 | (2006.01) |
| G02B 6/30 | (2006.01) |
| G02B 6/38 | (2006.01) |
| G02B 6/43 | (2006.01) |

(52) U.S. Cl.
CPC ............ *G02B 6/4243* (2013.01); *G02B 6/30* (2013.01); *G02B 6/423* (2013.01); *G02B 6/4239* (2013.01); *G02B 6/4292* (2013.01); *G02B 6/3883* (2013.01); *G02B 6/3885* (2013.01); *G02B 6/4214* (2013.01); *G02B 6/43* (2013.01)

(58) Field of Classification Search
CPC ..................................................... G02B 6/4243
See application file for complete search history.

(56) References Cited

U.S. PATENT DOCUMENTS

| 5,721,798 A * | 2/1998 | Kanda .................. G02B 6/3885 385/58 |
| 6,243,518 B1 * | 6/2001 | Lee ...................... G02B 6/3839 385/54 |
| 6,866,426 B1 * | 3/2005 | Steinberg .................. G02B 6/30 385/65 |
| 2014/0161396 A1 * | 6/2014 | Feng .................... G02B 6/4243 385/83 |
| 2014/0287208 A1 * | 9/2014 | Feldstein ................ C23C 18/50 428/209 |

FOREIGN PATENT DOCUMENTS

| JP | S61-010043 | 1/1986 |
| JP | H1-200308  | 8/1989 |

* cited by examiner

*Primary Examiner* — Sung Pak
(74) *Attorney, Agent, or Firm* — Smith, Gambrell & Russell, LLP.

(57) ABSTRACT

An optical connecting part includes: a holder including an end face for optical connection, one or more optical waveguides and a through-hole, the optical waveguides having a portion extending from the end face in a direction of a first axis, the through-hole extending from the end face in the direction of the first axis; and a coating disposed on an inner surface of the through-hole, the coating having oil repellency. The coating on the inner surface of the through-hole forms a guide hole.

3 Claims, 11 Drawing Sheets

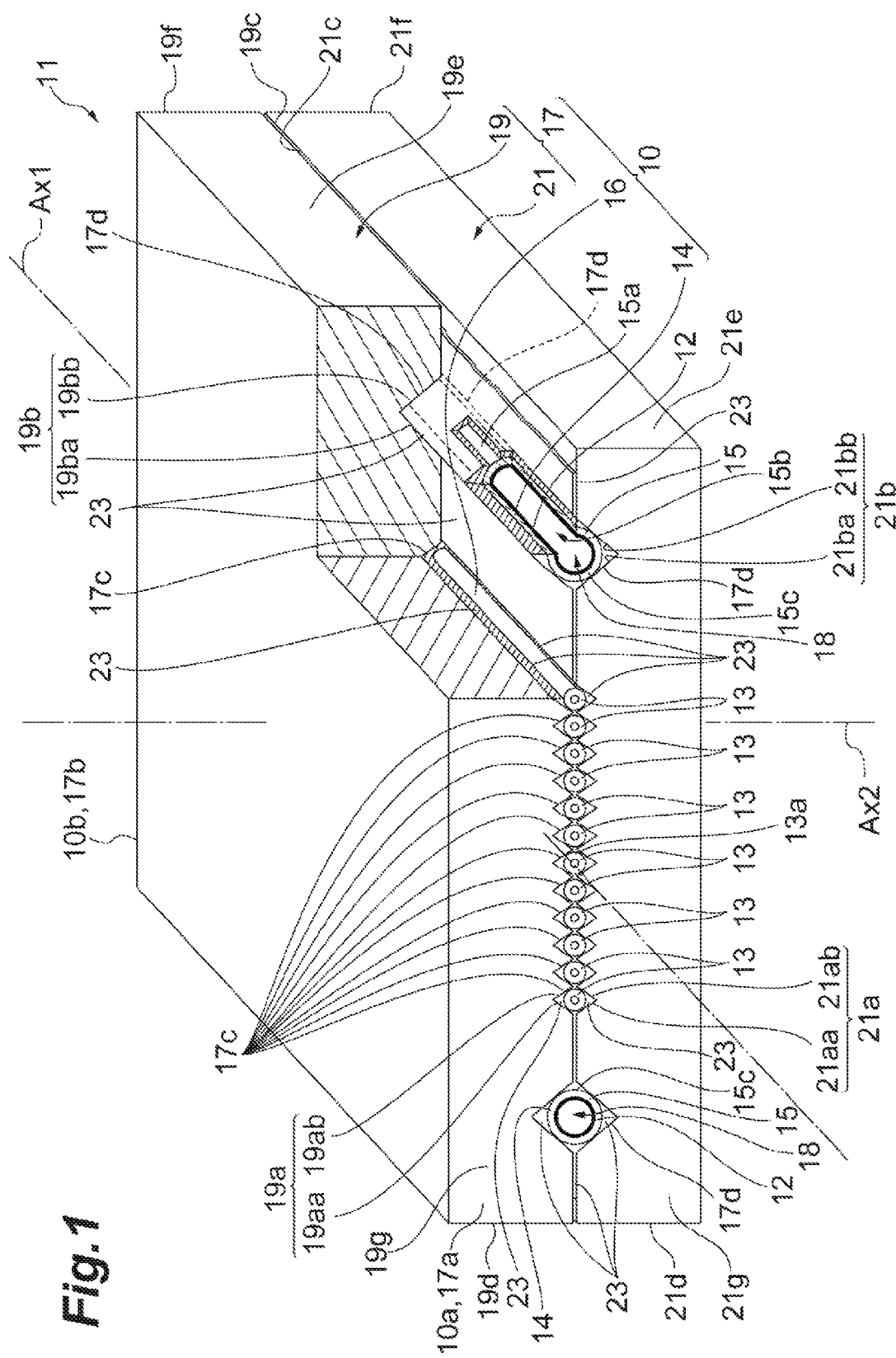

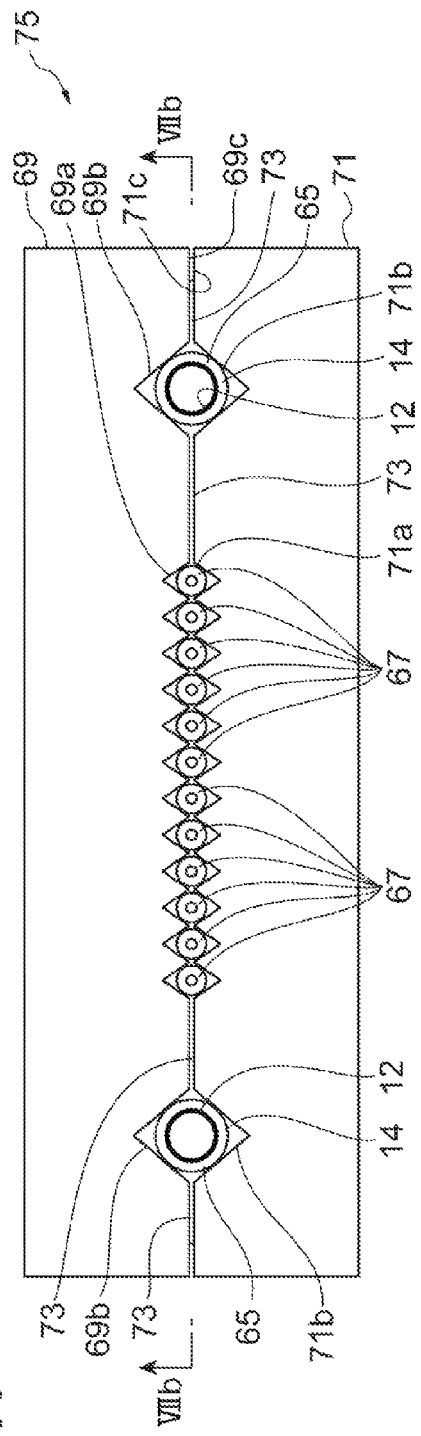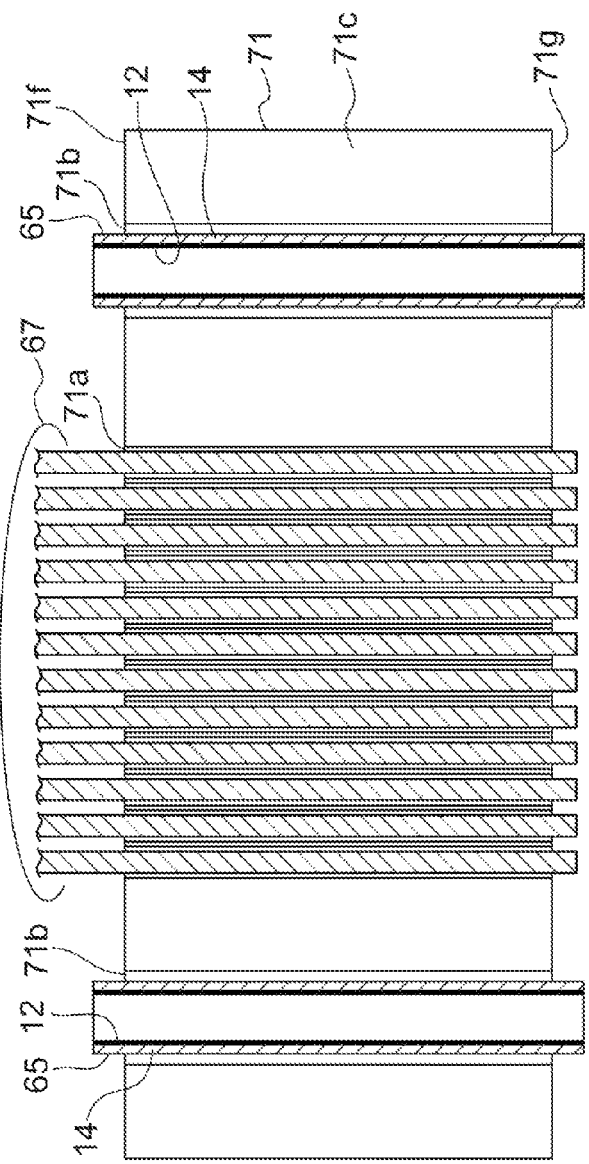

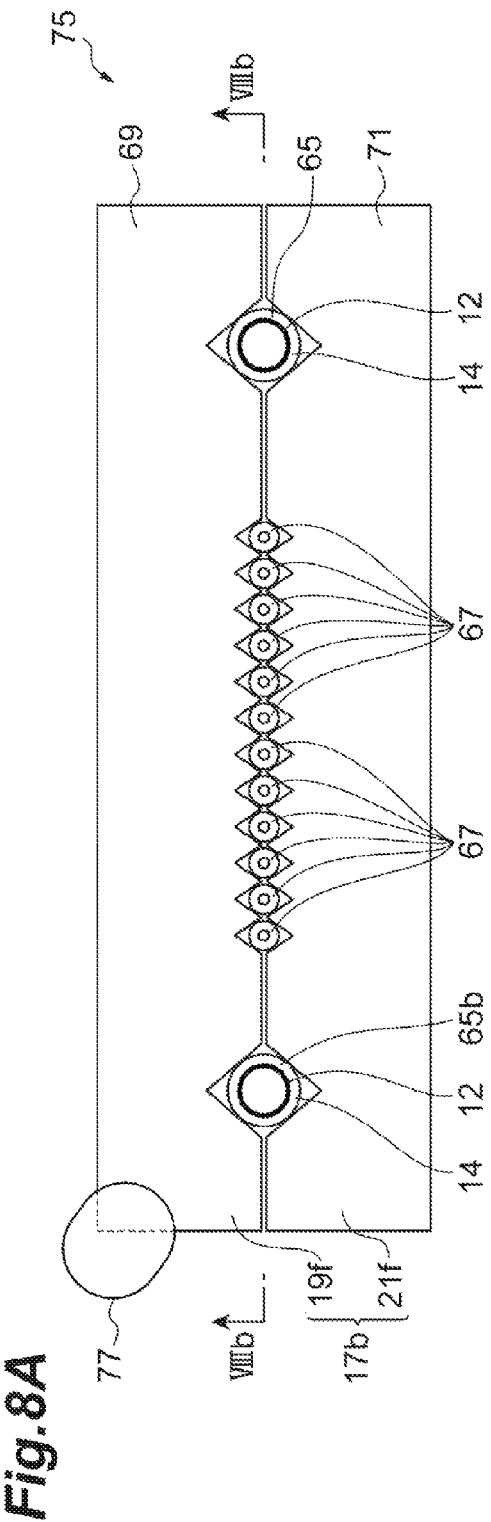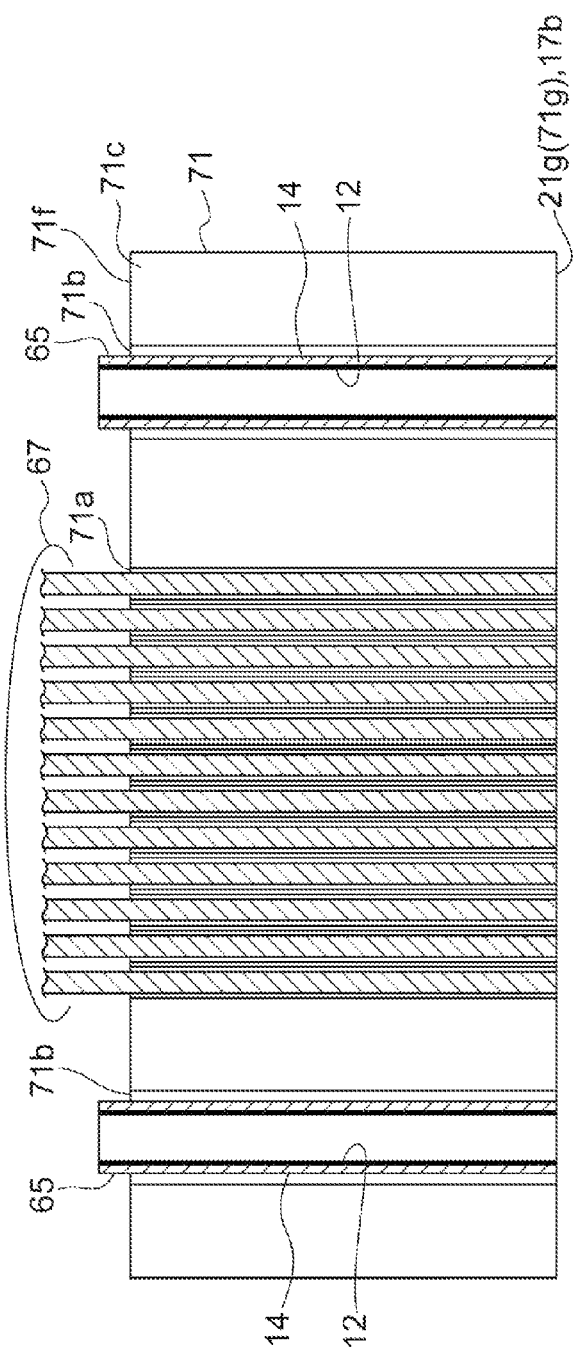

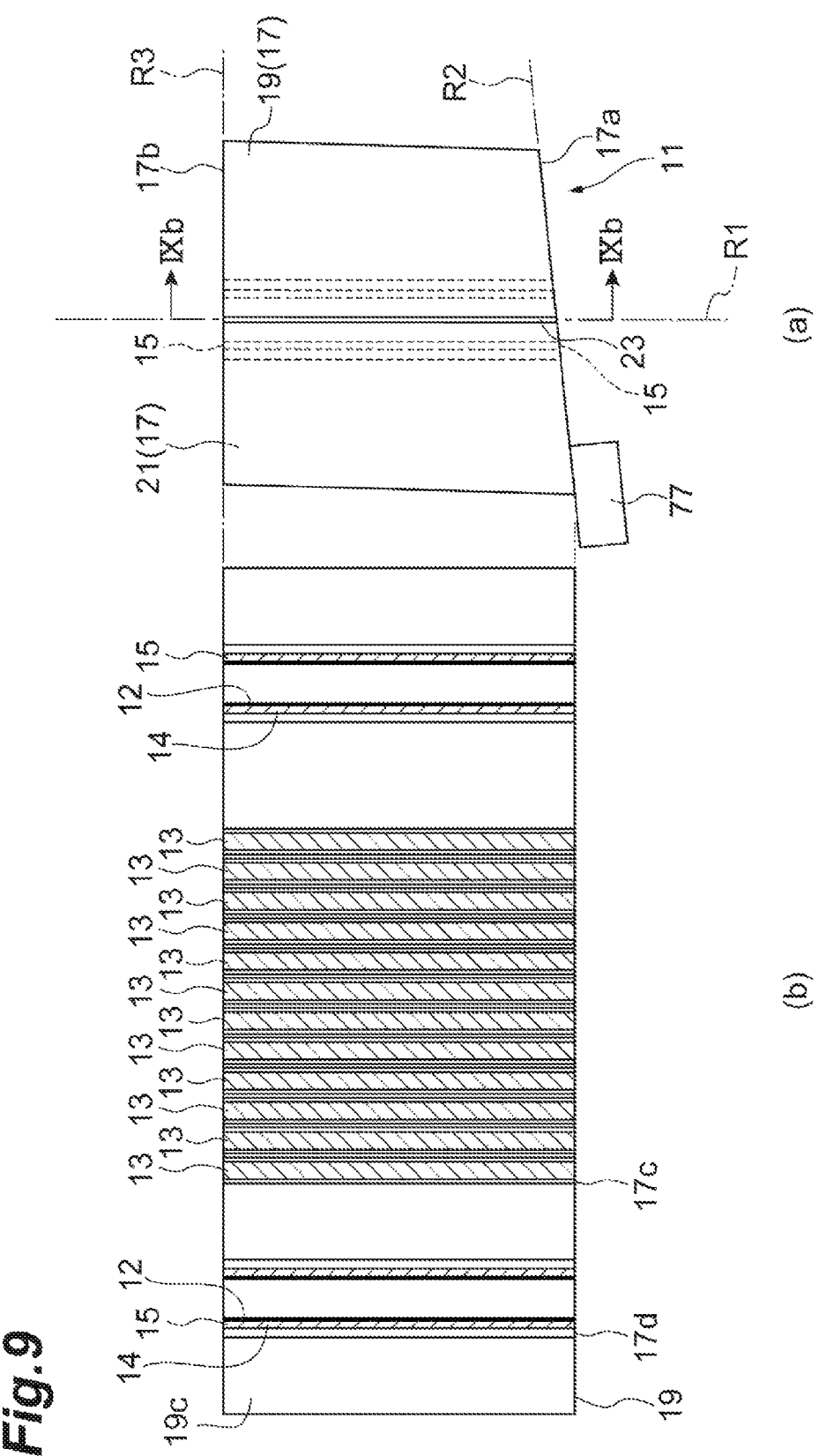

CONNECTING OPTICAL PART, OPTICAL PROCESSING APPARATUS, METHODS FOR FABRICATING CONNECTING OPTICAL PART, METHOD FOR FABRICATING GUIDE MEMBER PRODUCT

BACKGROUND OF THE INVENTION

Field of the Invention

The present invention relates to an optical connecting part, an optical processing apparatus, a method for fabricating an optical connecting part, and a method for fabricating a guide member product for a guide member part of the optical connecting part. This application claims the benefit of priority from Japanese Patent Application No. 2015-197788 filed on Oct. 5, 2015, which is herein incorporated by reference in its entirety.

Related Background Art

JP Patent Publication Laid Open No. 61-010043, referred to as "Patent Document 1," disclose glass, and JP Patent Publication Laid Open No. 01-200308, referred to as "Patent Document 2," discloses a structure for an optical connector utilizing a guide pin and a grooves for the guide pins.

SUMMARY OF THE INVENTION

One aspect of the present invention relates to an optical connecting part, which includes: a holder including an end face for optical connection, one or more optical waveguides and a through-hole, the optical waveguides having a portion extending from the end face in a direction of a first axis, the through-hole extending from the end face in the direction of the first axis; and a coating disposed on an inner surface of the through-hole, the coating having oil repellency, the coating on the inner surface of the through-hole forming a guide hole.

Another aspect of the present invention relates to an optical processing apparatus, which includes: an optical connecting part; a semiconductor optical device optically coupled to the optical connecting part; and an adhesive member bonding the optical connecting device to the semiconductor optical device, the semiconductor optical device integrating an optical coupling element, an optical element processing light associated with the optical coupling element, and a circuit element processing an electrical signal associated with the optical element.

Yet another aspect of the present invention relates to a method for fabricating an optical connecting part, the method includes steps of: preparing a guide part including a through-hole, and a coating disposed on an inner surface of the through-hole, the coating having oil repellency, the through-hole extending from one end to another end of the guide part; preparing a first member and a second member for a holder, and an optical waveguide part; and forming a holder part including the first member, the second member, and the optical waveguide part disposed between the first member and the second member, preparing a guide part including steps of: forming a composite plated layer on a core member including a side face of metal, the composite plated layer including a mixture containing fluorine-containing organic compound and metal; forming a metal plated layer on the composite plated layer to form a plated product; and removing the core member out of the plated product.

Still another aspect of the present invention relates to a method for fabricating a guide member product for a guide member of an optical connecting part, the method which includes steps of: forming a composite layer on a metal side of a core member by plating, the composite layer including a mixture containing fluorine-containing organic compound and metal; after forming the composite layer, forming a plated product; and removing the core member from the plated product, forming a plating product including a step of forming a metal plated layer on the composite layer.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

FIG. 1 is a perspective view schematically showing an optical connecting part according to the present embodiment.

FIGS. 7A and 7B are schematic views showing a major step in the method according to the present embodiment.

FIGS. 8A and 8B are schematic views showing a major step in the method according to the present embodiment.

FIG. 9 is a schematic view showing a major step in the method according to the present embodiment.

DESCRIPTION OF THE PREFERRED EMBODIMENTS

Figure 2A:
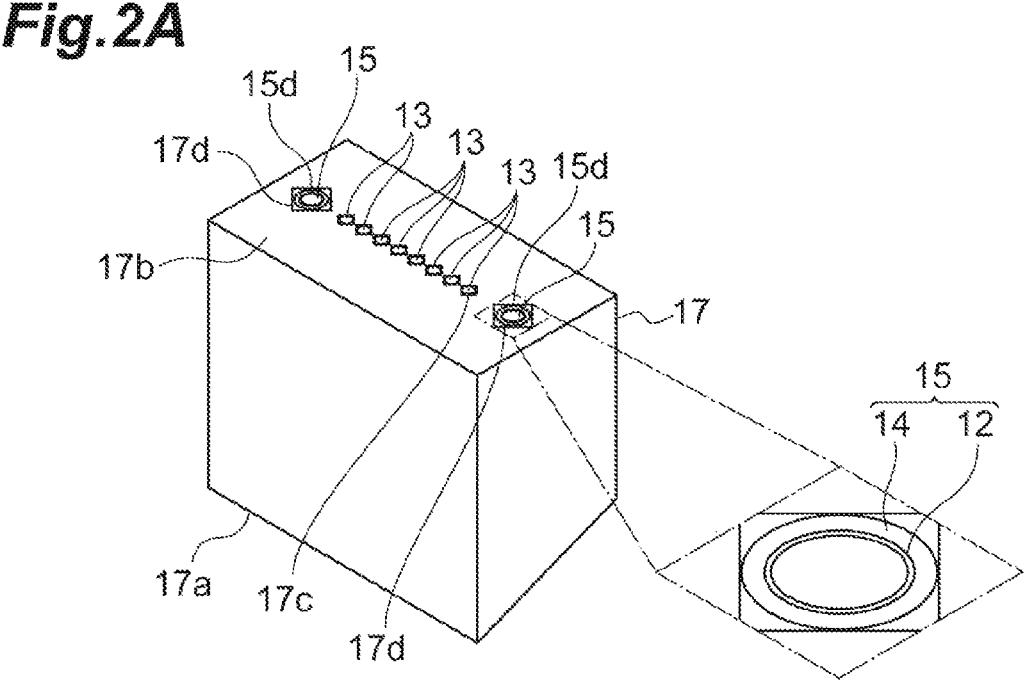
FIGS. 2A and 2B are schematic views each showing the appearance of a typical optical connecting part according to the present embodiment.

An available optical connector has two members, one of which has a V-shaped groove for supporting the optical fiber, sandwiching an optical fiber. The optical fiber is placed in the V-shaped groove of the member, and the two members are bonded to each other by an adhesive member between the members to form an integrated structure for the optical connector. The optical connector thus formed utilizes guide pins for positioning for optical coupling. The members of the optical connector also have grooves each of which can support the side of the guide pin inserted thereinto, and the grooves in the members each comprise one or more flat supporting faces. The supporting faces in the members form a guide hole for receiving the guide pin therein, and the guide pin thus received is supported by the guide hole. Inserting the guide pin into the guide hole may form a narrow space between the side of the guide pin and the supporting faces of the guide hole in the integrated structure.

In the assembling with the guide pins, in particular, an optical connecting part, such as an optical connector, is optically aligned to an optical device (e.g., a silicon photonics device), and after the alignment, an adhesive material is cured to mount the optical connecting part onto the optical device. In this mounting, the guide pins are used for the alignment in connecting the optical connector with the optical device, and the cured adhesive material may fix the guide pins as well as the optical connecting part to the optical device. The inventors' observation reveals the adhesive bonding the optical connecting part to the optical device creeps up into the guide hole in the optical connector, and/or flows up in the narrow space between the inner face of the guide hole and the guide pin in the optical connector. Further, the inventors' study reveals that this penetration of the adhesive relates to capillary action.

It is an object of one aspect according to the present invention to provide an optical part that can reduce the amount of adhesive creeping up into the guide hole because of capillary action.

It is an object of another aspect according to the present invention to provide an optical processing apparatus including the optical part. It is an object of yet another aspect according to the present invention to provide a method for fabricating an optical part. It is an object of still another aspect according to the present invention to provide a method for fabricating a guide member product for a guide part of an optical part.

Specific embodiments according to the present above aspects are described below.

An optical connecting part according to an embodiment includes: a holder including an end face for optical connection, one or more optical waveguides and a through-hole, the optical waveguides having a portion extending from the end face in a direction of a first axis, the through-hole extending from the end face in the direction of the first axis; and a coating disposed on an inner surface of the through-hole, the coating having oil repellency. The coating on the inner surface of the through-hole forms a guide hole.

This optical connecting part provides the holder with a guide hole, which extends in the direction of the first axis from one end face of the holder. The adhesive material that is provided on the end face of the optical connecting part is likely to reach the end of the guide hole due to its fluidity. The coating film on the inner surface of the guide hole has oil repellency. This coating can prevent the adhesive material on the end face from penetrating deeply into the guide hole by capillary action.

In the optical connecting part according to an embodiment, the coating includes fluorine-containing organic compound and metal.

A mixture including metal and fluorine-containing organic compound can provide the optical connecting part with a significant oil repellency.

In the optical connecting part according to an embodiment, the holder includes the optical waveguides, a holding part supporting the optical waveguides, and a pipe-shaped base supported by the holding part, the pipe-shaped base has the through-hole, and the coating is disposed on the inner surface of the through-hole.

In the optical connecting part, the coating film is formed over the through-hole of the base.

An optical processing apparatus according to an embodiment includes: an optical connecting part according to an embodiment; a semiconductor optical device optically coupled to the optical connecting part; and an adhesive member bonding the optical connecting device to the semiconductor optical device. The semiconductor optical device integrates an optical coupling element, an optical element processing light associated with the optical coupling element, and a circuit element processing an electrical signal associated with the optical element.

The optical processing apparatus can reduce the amount of an adhesive creeping up into the guide hole in the step of optically aligning the semiconductor optical device with the optical connecting part, allowing the reduction in an external force applied to the optical connecting part in removing the guide pin from the optical processing apparatus. This reduction improves the reliability in optical coupling between the optical connecting part and the semiconductor optical device.

A method for fabricating an optical connecting part according to an embodiment include steps of: preparing a guide part including a through-hole, and a coating disposed on an inner surface of the through-hole, the through-hole extending from one end to another end of the guide part; preparing a first member and a second member for a holder, and an optical waveguide part; and forming a holder part including the first member, the second member, and the optical waveguide part disposed between the first member and the second member. The coating has oil repellency. Preparing a guide part includes steps of: forming a composite plated layer on a core member including a side face of metal, the composite plated layer including a mixture containing metal and fluorine-containing organic compound, forming a metal plated layer on the composite plated layer to form a plated product, and removing the core member out of the plated product.

The method for fabricating the optical connecting part forms a composite plated layer, including a mixture containing a metal and a fluorine-containing organic compound, on the metal side of the core member by electro-plating to fabricate a plated product. The composite plated layer and the metal base are formed on the metal side of the core member, and the core member is removed from the plated product to form a guide member product. The guide member product has a through-hole, which is formed by the removal of the core member from the guide member product, and an inner surface of the through-hole is provided by the covering of the composite layer disposed on the metal base. The guide part for the optical part is produced from the guide member product. The guide member guiding a guide pin is provided with oil repellency, and has an outer side of metal. The outer side of the guide member is supported by the first member and the second member, and is disposed therebetween. The size of the through-hole can be controlled by the outer size of the core member and the outer size of the guide member product can be controlled by the total thickness of the plated layer for the metal base and the composite plated layer. The through-hole can receive a guide pin therein. The through-hole can provide the optical connecting part with a guide hole, which extends from the end face in the direction of the first axis.

The coating on the inner side of the guide hole has oil repellency.

A method for fabricating a guide member product for a guide member of an optical connecting part according to an embodiment includes steps of: forming a composite layer on a metal side of a core member by plating, the composite layer including a mixture containing metal and fluorine-containing organic compound; after forming the composite layer, forming a plated product; and removing the core member from the plated product. Forming a plated product includes a step of forming a metal plated layer on the composite layer.

The method for fabricating the guide member product forms a composite layer, including a mixture containing a metal and a fluorine-containing organic compound, on the metal side of the core member by electro-plating to fabricate a plated product. The composite layer and the metal base are formed on the metal side of the core member, and the core member is removed from the plated product to form a guide member product. The guide member product has a through-hole formed by the removal of the core member from the guide member product. The inner surface of the through-hole is provided by the covering of the composite layer disposed on the metal base. The guide part for the optical part is produced from the guide member product. The guide member is disposed between the first member and the second member, so that the outer surface of the guide member is supported thereby. The through-hole of the guide member can receive a guide pin, which is guided by the inner side of the guide member. The size of the through-hole can be controlled by the outer size of the core member, and the outer size of the guide member product can be controlled by the total thickness of the plated layer for the metal base and the composite layer.

In the method according to an embodiment, forming a plated product includes the step of cutting the core member, the composite layer and the metal layer together to form the plated product.

The method for fabricating the guide member product can enhance processing accuracy of the composite layer and the metal plated layer.

The teachings of the present invention can be readily understood by considering the following detailed description with reference to the accompanying drawings shown as examples. Referring to the accompanying drawings, embodiments according to an optical connecting part, an optical processing apparatus, a method for making an optical connecting part, and a method for making a guide member product for a guide part of an optical connecting part will be illustrated below. When possible, the same portions will be denoted by the same reference numerals.

FIG. 1 is a schematic perspective view showing an optical connecting part according to the present embodiment. The optical connecting part 11 includes a holder 10 and a coating 12. The holder 10 includes an end face 10*a* for optical connection, another end face 10*b* opposite thereto, an optical waveguide(s) 16, and a guide hole(s) 18 provided by a through-hole. The optical connecting part 11 may be used such that the end face 10*a* for optical connection is fixed by an adhesive to an optical device. The optical waveguide 16 has a portion extending from the end face 10*a* in the direction of the first axis Ax1. The guide hole 18 extends from the end face 10*a* in the direction of the first axis Ax1. The coating 12 is disposed on the inner surface of the through-hole, and has oil repellency. The coating 12 has a surface, which defines the guide-hole 18, and is disposed on the inner surface of the through-hole. The oil repellency of the inner surface of the guide hole 18 is superior to that of the end face 10*a*.

This optical connecting part provides the holder 10 with the guide hole 18, which extends in the direction of the first axis Ax1 from the end face 10*a* of the holder. The adhesive material that is disposed on the end face 10*a* of the optical connecting part 11 is likely to reach the end of the guide hole 18 located on the end face 10*a* because of its fluidity. The coating 12 on the inner surface of the guide hole 18 has oil repellency. The coating 12 can prevent adhesive material on the end face 10*a* from penetrating deeply into the guide hole 18 by capillary action.

The coating 12, such as a coating film, includes a mixture comprising, for example, a fluorine-containing organic compound and a metal. The mixture containing fluorinated organic compounds and metal has desired oil repellency. Alternatively, the coating 12 may include a silsesquioxane compound having a silicone chain.

Specifically, the holder 10 includes a base 14, the optical waveguide 16, and a holder part 17. The holder part 17 supports the optical waveguide 16. The base 14 is provided with the through-hole defined by the side surface extending in the direction of an axis, and the through-hole is provided by, for example, a pipe shaped portion of the base 14. The coating 12 is disposed within the through hole of the base 14, and is supported by the inner side of the base 14. The base 14 is supported by the holder part 17. In the present embodiment, the coating 12 extends from one end of the base 14 to the other so as to cover the inner surface of the through-hole of the base 14. The base 14 is made of, for example, metal, and material of the base 14 may be a nickel. The metallic base 14 can firmly support the mixture comprising metal and fluorine-containing organic compound.

In the optical connecting part 11, the optical waveguide 16 may be, for example, an optical fiber 13. The coating 12 and the base 14 constitute a guide pipe 15. The inner surface of the guide pipe 15 has oil repellency higher than that of the outer surface of the guide pipe 15. The holder part 17 includes a first end face 17*a*, a second end face 17*b*, a supporting portion 17*c*, and a guide portion 17*d*. In the present embodiment, the holder part 17 includes a first member 19 and a second member 21. The optical fiber 13 and the guide pipe 15 are positioned between the first member 19 and the second member 21, and the holder part 17 includes an adhesive member 23, which bonds the first member 19 and the second member 21 with each other. The end 13*a* of the optical fiber 13 is positioned at the first end face 17*a* (10*a*).

The support portion 17*c* extends from the first end face 17*a* toward the second end face 17*b* in order to support the optical fiber 13. For the support, the support portion 17*c* preferably has at least three faces. In the present embodiment, the first support portion 19*a* of the first member 19 has a first side face 19*aa* and a second side face 19*ab*, both of which are disposed for supporting the optical fiber 13, and the second support portion 21*a* of the second member 21 has a first side face 21*aa* and a second side face 21*ab*, both of which are disposed for supporting the optical fiber 13. In the present embodiment, the first side face 19*aa* and the second side face 19*ab* of the first supporting portion 19*a*, and the first side face 21*aa* and the second side face 21*ab* of the second supporting portion 21*a* each have a portion coming in direct contact with the optical fiber, and anther portion coming in direct contact with the adhesive member 23 that supports the optical fiber.

The guide portion 17*d* extends from the first end face 17*a* to the second end face 17*b* so as to support the guide pipe 15. In order to enable the supporting of the guide pipe 15, the guide portion 17*d* preferably has at least three supporting faces. The guide portion 17*d* has one portion in direct contact with the outer surface 15*a* of the guide pipe 15, and another portion in contact with the adhesive member 23 supporting the outer surface 15*a* of the guide pipe 15. In the present embodiment, the first side face 19*ba* and the second side face 19*bb* of the first supporting portion 19*b* have a portion coming in direct contact with the guide pipe, and another portion coming in contact with the adhesive member 23 that supports the outer surface 15a of the guide pipe 15. Further, in the present embodiment, the guide portion 21b of the second member 21 has a first side face 21ba and a second side face 21bb, both of which are provided for supporting the guide pipe 15.

The optical connecting part 11 allows the adhesive member 23 to bond the optical fiber 13 to the holder part 17. The optical fiber 13 is supported disposed between the first member 19 and the second member 21 by the supporting portion 17c, and is firmly fixed in the holder part 17 by the adhesive member 23. Further, the guide pipe 15 is disposed between the first member 19 and the second member 21 and is secured to the guide portion 17d of the holder part 17 by the adhesive member 23 therebetween. The guide pipe 15 has a guide hole 15b capable of receiving a guide pin for alignment therein. The guide pin is inserted into the guide portion 17d, and the insertion of the guide pin forms a small space between the inner surface of the guide pipe 15 and the side face of the guide pin in the guide portion 17d. The guide pipe 15 has a side wall defining the guide hole 15b. In the present embodiment, the inner side of the guide pipe 15 comprises a mixture comprising metal and fluorine-containing organic compound, and the mixture has a higher oil repellency than that of the base that mount the mixture thereon. The end face 10a of the holder 10 (the first end face 17a of the holder part 17) does not have a larger oil repellency than an oil repellency inherent to the material of the holder part 17, and the end face 10a is not subjected to any processing for enhancing the oil repellency. The oil repellency of the inner face is effective in preventing the adhesive applied to the first end face 17a for optical connection from creeping up on the inner face of the guide pipe 15 by capillary action, and/or from spreading to a slight gap between the guide pipe 15 and the inner face. The oil repellency of the inner surface of the guide pipe 15 prevents the adhesive member 23 from penetrating in the deep inside of the guide hole 15b. In addition, because of the difference in the oil repellency between the first end face 17a and the inner face of the guide pipe 15 allows the adhesive material on the first end face 17a to remain more in the first end face 17a. The guide pipe 15 has an end portion 15c located at the first end face 17a, and extends from the first end face 17a to another end (another end 15d of FIGS. 2A and 2B) opposite of the end portion 15c. The guide pipe 15 has a side wall with oil repellency, which extends continuously from the end portion 15c to the other end 15d. Preferably, the guide pin may have an outer side of oil repellency, in particular, which may comprise a mixture containing metal and fluorine-containing organic compound.

The first member 19 has a bonding surface 19c to which the adhesive member 23 is applied. In the present embodiment, the first support portion 19a and the guide portion 19b are disposed on the bonding surface 19c. In the present embodiment, the bonding surface 19c extends from one of a side 19d and another side 19e of the first member 19 to the other, and reaches the first end face 19f and the second end face 19g of the first member 19. The adhesive member 23 may be also applied to the bonding surface 21c of the second member 21. In the present embodiment, the second support portion 21a and the guide portion 21b are disposed on the bonding surface 21c. The bonding surface 21c extends from one of the side 21d and the other side 21e of the second member 21 to the other, and reaches the first end face 21f and the second end face 21g of the second member 21.

The optical fiber 13 and the guide pipe 15 extend in the direction of the first axis Ax1, and in order to enable the extension, the first member 19 and the second member 21 are arranged in the direction of a second direction Ax2 intersecting with the first axis Ax1 so as to hold the optical fiber 13 and the guide pipe 15 therebetween. For the holding, the first member 19 has a first supporting portion 19a and a guide portion 19b that are disposed on the bonding surface 19c extending in a direction intersecting with the second direction Ax2, and the second member 21 has a second supporting portion 21a and a guide portion 21b which are disposed on the bonding surface 21c extending in a direction intersecting with the second direction Ax2. The adhesive member 23 spreads over between the bonding surface 21c and the bonding surface 19c so as to firmly bond the first member 19 to the second member 21, so that the optical fiber 13 and the guide pipe 15 are supported by the supporting portion 19a and the guide portion 19 b, respectively, and are held by the holding part 17 including the first member 19 and the second member 21. This structure allows the adhesive member 23 to extend across the guide portion 19b to the outer face 15a of the guide pipe 15, without the adhesive member 23 penetrating in the deep inside of the guide hole 15b of the guide pipe 15.

The optical fiber 13 may comprise, for example, a quartz single mode optical fiber. The optical fiber 13 includes a core and a clad disposed around the core. The first member 19 and the second member 21 each may be made of glass, such as borosilicate glass, or quartz glass. Such glass material can provide a first member 19 and second member 21 with accuracy in size.

Figure 2B:
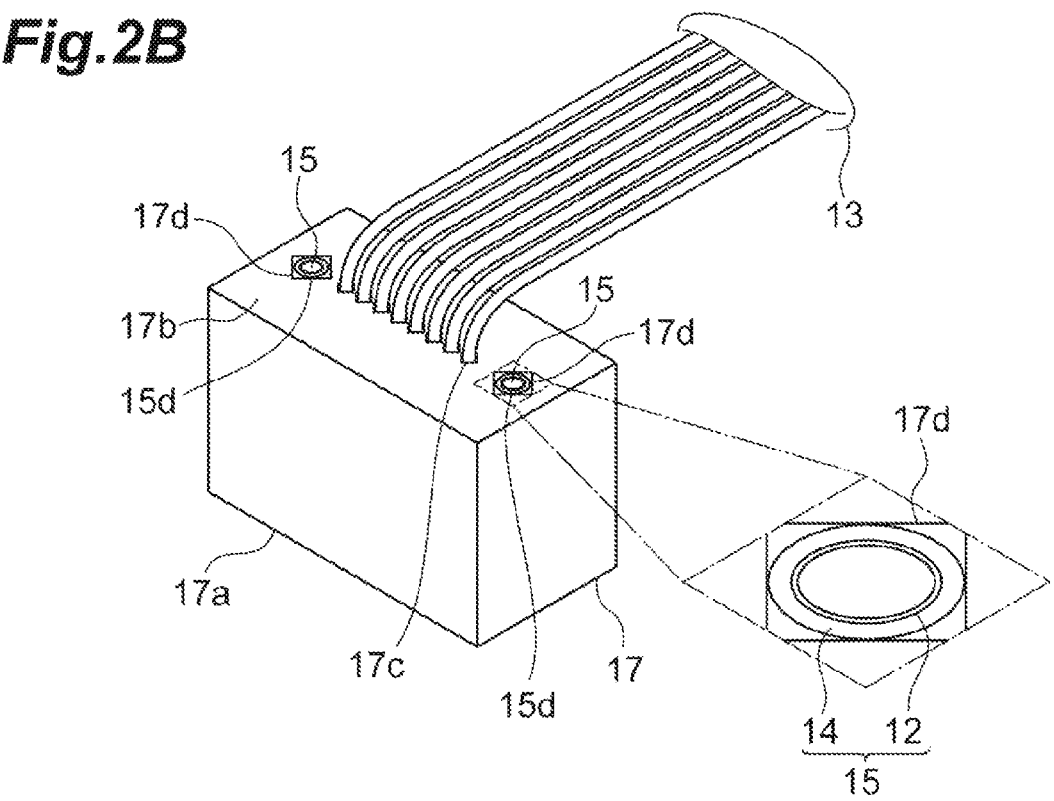

FIGS. 2A and 2B are views each showing the appearance of a typical optical connecting part according to the present embodiment. As shown in FIG. 2A, the optical connecting part 11 may have a stub structure. The optical fiber 13 in the present structure extends from the first end face 17a of the holder part 17 to the second end face 17b. Alternatively, as shown in FIG. 2B, the optical connecting part 11 may have a pigtail structure with a pigtail fiber. The optical fiber 13 in the pigtail structure extends outward from the second end face 17b of the holder part 17. Specifically, the optical fiber 13 in the present structure includes a first portion which extends inside the holder part 17, and a second portion which is not disposed in the holder part 17 and extends from the second end face 17b to the outside.

FIGS. 3A to 3F are views each showing a major step in an exemplary method of fabricating a guide member product for the guide part of the optical connecting part. In the method, a guide pipe is produced using an electroforming process. A metal core member is prepared, and the metal core member has a diameter corresponding to that of the guide pin. Such a metal core member can be produced by, for example, NC machining. The tolerance in the diameter of the metal core material thus prepared can be, for example, −0.5 to +0.5 micrometers. The metal core member may include, for example, nickel, copper, stainless steel, cemented carbide, and/or tungsten carbide.

Figure 3A:
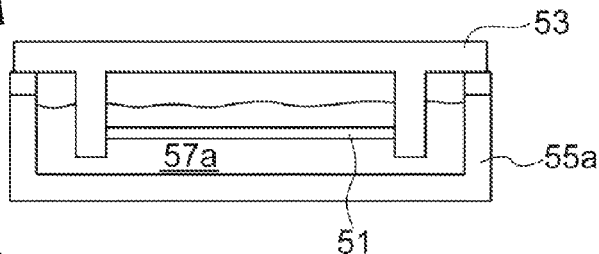
FIGS. 3A to 3F are schematic views each showing a major step in a method of making a guide member product for a guide part of the optical connecting part according to the present embodiment.
Figure 3B:
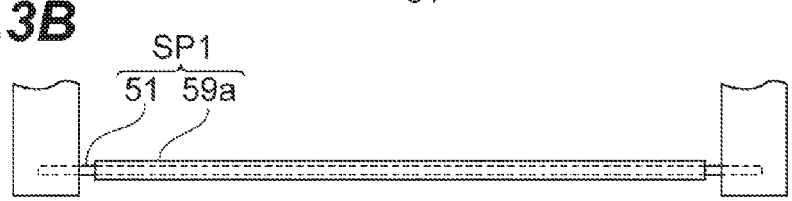
Figure 3C:
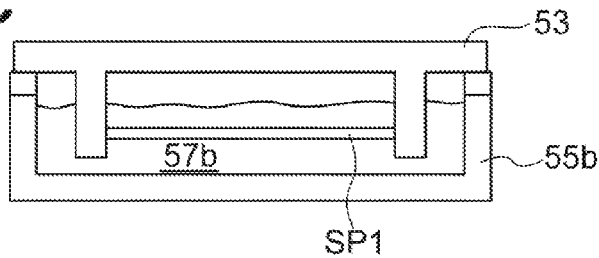
Figure 3D:
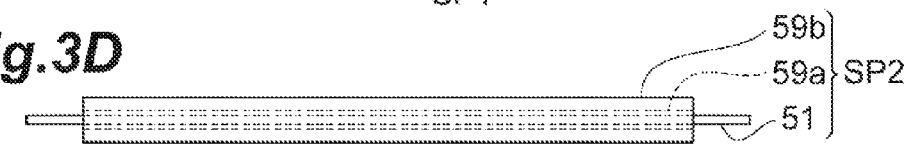
Figure 3E:
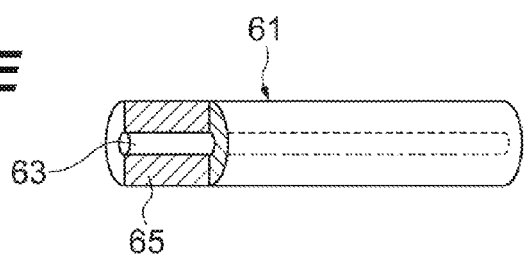
Figure 3F:
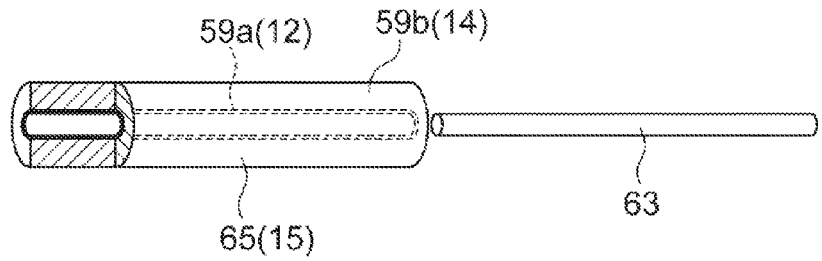

In an electroforming process, while accurately controlling the quantity of electricity supplied to an electrolytic solution 57a in an electro-plating method, metal is deposited on the side of the metal core member 51. The controlling of the quantity of electricity allows the accurate control of the amount of metal deposition. In the present embodiment, the following electrolyte solutions are prepared: a first electrolyte solution 57a allowing a mixture containing a metal and a fluorinated organic compound to deposit; and a second electrolyte 57b allowing metal for a base to deposit, and the metal core member 51a is also prepared. The first electrolyte solution 57a is stored in a first electrolytic cell 55a, and the second electrolyte solution 57b is stored in a second electrolytic bath 55b. After the preparation, the metal core member 51 is attached to a jig 53, such as supporting tool. As shown in FIG. 3A, the jig 53 and the metal core member 51 attached thereto are immersed together in the first electrolyte solution 57a in the first electrolytic bath 55a, and an energization is started. After a desired quantity of electricity is supplied, as shown in of FIG. 3B, the metal core member 51 and the jig 53 are removed from the first electrolytic bath 55a. The energization can form a composite layer 59a, which includes a mixture comprising a fluorine-containing organic compound and a metal, by plating on the metal core member 51. The resulting product, referred to as a coating product SP1. The coating product SP1 comprising the composite layer 59a and the metal core member 51 remains attached to the jig 53. As shown in FIG. 3C, the jig 53 and the coating product SP1 attached thereto are immersed in the second electrolyte solution 57b in the second electrolytic bath 55b, and an energization is started. A sufficient quantity of electricity is fed to the second electrolytic bath 55 b, and as shown in FIG. 3D, the jig 53 and the metal core member 51 is removed from the second electrolytic bath 55b. This product is referred to as a plated product SP2. In this fabrication, the metal base 59b is formed on the side of the coating product SP1. The plated product SP2 is provided with the metal base 59b, which is formed by a plating method on the composite layer 59a (a metallic wall deposited). The metal base 59b includes a deposited metal having a thickness enough to support the composite layer 59a on the side of the metal core member 51 in the plated product SP2. If necessary, the metal core 51 may be pulled out from the plated product SP2. In the present embodiment, as shown in FIG. 3E, the plated product SP2, which comprises the metal core member 51, the composite layer 59a and the metal base 59b, is cut to a desired length to form an intermediate product 61, and the intermediate product 61 has a cross-section substantially equivalent to that the plated product except that their lengths are different from each other. The intermediate product 61 includes a core 63, and a metal pipe 65 having a composite laminated structure disposed on a side surface of the core member 63. As shown in FIG. 3F, the core 63 is removed from the intermediate product 61 to obtain a metal pipe, that is, a guide pipe part of the two-layered structure consisting of the composite layer 59a and the metal base 59b. The tolerance of the outer diameter of the guide pipe part can be, for example, −0.5 to +0.5 micrometers. The outer diameter of the guide pipe part and the tolerance thereof depend upon the control precision of the amount of charge supplied to the electrolytic solutions.

Example

A round bar of tungsten carbide (a rod having a circular cross-section) was prepared. The round bar was processed by centerless grinding to form a product with a desired accuracy in diameter, and in the present embodiment, the round bar thus processed had a tolerances of −0.0002 mm to +0.0002 mm at the center of a diameter of 0.7 mm. The processed core material was attached to a holder, and the holder and the processed core material attached thereto were subjected to degreasing treatment. Thereafter, the round bar held by the holder was immersed in the electrolysis solution. The electrolysis solution was prepared for forming the composite plated layer including fluorine-containing compound dispersed as an eutectoid material into a metal.
An exemplary electrolytic solution.
Nickel sulfamate: 350 g/liter.
Nickel chloride: 45 g/liter.
Boric acid: 40 g/liter.
Cationic fluorine-containing surfactant: 1 g/liter.
Polytetrafluoroethylene (PTFE) particles: 100 g/liter (average particle size of 0.2 to 0.3 micrometers).
An exemplary plating condition.
pH: 4.0.
Cathode current density: 3 A/cm$^2$.
Temperature of the plating solution: 50 degrees Celsius.
Anode material: nickel.
Circulated and stirred.
A nickel-plated composite layer, which had a thickness ranging from 0.3 to 1.0 micrometers (the nickel-plated composite layer formed by dispersing PTFE of 25% into plated metal so as to cause an eutectoid reaction between the two substances), was formed on the metal core using the above plating conditions.

A product including the holder, the round rod installed to the holder, and the nickel-plated composite layer formed on the round rod was immersed in an electrolytic solution for metal plating. The electrolytic solution was prepared for metal plating containing no PTFE particle.
An exemplary electrolytic solution.
Nickel sulfamate: 350 g/liter.
Nickel chloride: 45 g/liter.
Boric acid: 40 g/liter.
Cationic fluorine-containing surfactant: 1 g/liter.
An exemplary of plating condition.
pH: 4.0.
Cathode current density: 3 A/cm$^2$.
Temperature of the plating solution: 50 degrees Celsius.
Anode materials: nickel.
Circulated and stirred.
A nickel layer was formed by plating using the above plating condition such that the metal plated layer has an outer surface with a diameter of 1 mm.

After the nickel plating was completed to form a plated product, this plated product was removed from the plating bath. The plated product was cut to the desired length to form plated product pieces. After the cut, the core material was pulled out from the plated product piece to form a guide pipe part. The pulling-out may utilize, for example, the difference in thermal expansion coefficient between the core material and the plated metal layer (in the present embodiment, thermal expansion coefficient of nickel is greater than the thermal expansion of tungsten carbide).

The pipe according to the present embodiment has a pipe inner surface made of a coating film having both water- and oil-repellencies, and has an inner diameter defined by the diameter of the core material. The fabrication method can provide the pipe with water and oil repellencies, a required accuracy in dimension, and a tolerance of the inner diameter of the pipe (−0.0005 to +0.0005 mm). The guide member comprising a coating film of the water and oil repellencies can be provided with a desired accuracy in the outer diameter of the pipe (−0.0005 to +0.0005 mm) by controlling the energization amount of charge and the energization time for plating. The pipe has an inner surface of greater water and oil repellencies than those of the outer surface of the pipe.

Fluorine-containing organic compound to be added to the electrolytic solution may include, for example, polytetrafluoroethylene (PTFE), tetrafluoroethylene-hexafluoropropylene copolymer (FPE), hexafluoroethylene-perfluoroalkyl vinyl ether copolymer (FPA), graphite fluoride. These fluorinated organic compounds each have a structure in which fluorine atoms in each compound are densely arranged around a carbon atom of the compound, and the structure makes the surface of the fluorinated organic compounds less reactive, leading to properties to repel against any of non-polar liquids, such as hexadecane, and polar liquids, such as water (water repellency, and oil repellency).

Figure 4:
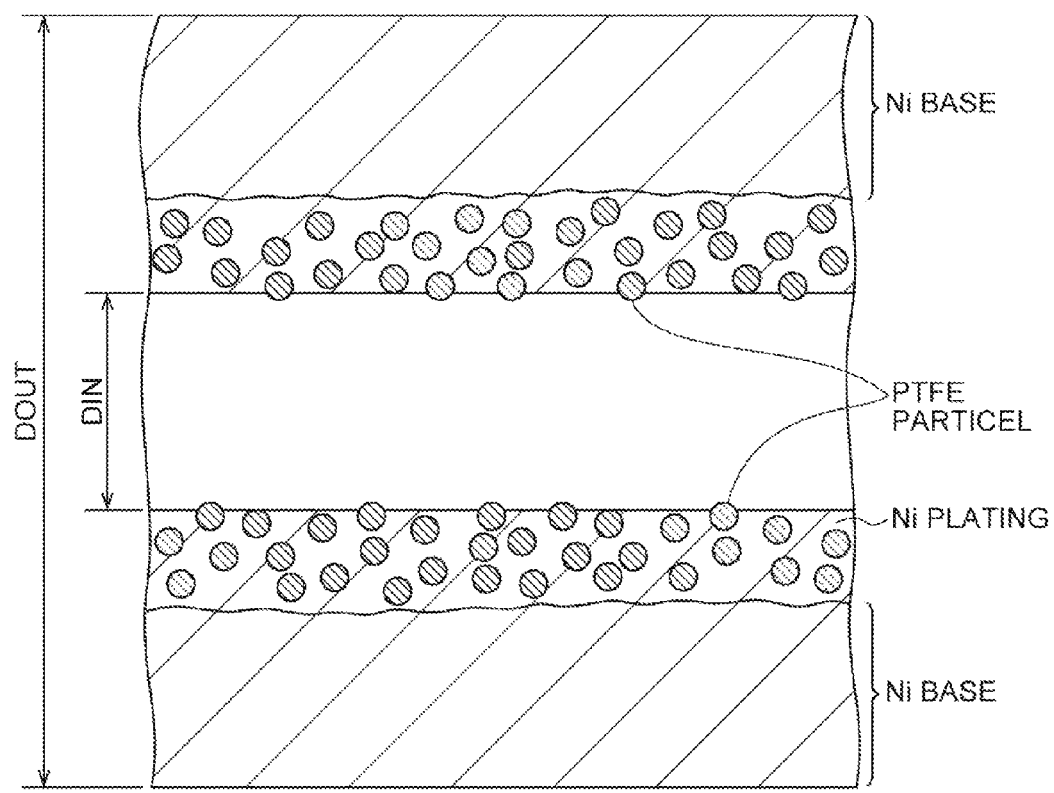
FIG. 4 is a longitudinal cross sectional view schematically showing an exemplary guide pipe formed by the fabricating method according to the present embodiment.

FIG. 4 is a schematic cross sectional view showing the guide pipe formed by the manufacturing method in the present embodiment. PTFE particles are dispersed in the nickel metal base. The inner surface of the guide pipe includes the surfaces of the PTFE particles and the nickel metal appearing thereon. The inner surface exhibits water- and oil-repellencies from the PTFE particles. The ratio of the PTFE surface to the total inner surface in the inner surface (the area of PTFE surface exposed/the area of the total surface) is 35% to 10%.

Figure 5:
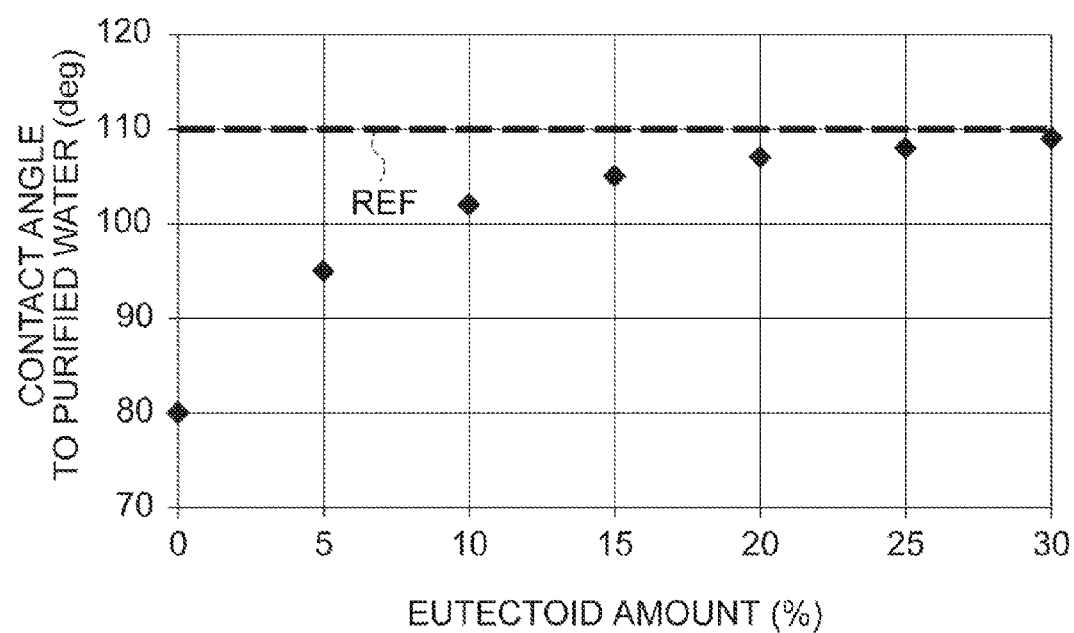
FIG. 5 is a drawing showing a relationship between a contact angle to purified water (polar liquid) and a mixture containing a plated nickel and PTFE particles dispersed and co-deposited in the plated nickel.

FIG. 5 is a view showing a relationship between the contact angle to purified water (polar liquid) and a mixture containing a plated nickel and PTFE particles dispersed and co-deposited in the plated nickel. Here, the co-deposition amount is defined as the volume fraction of PTFE particles to the precipitate deposited by plating. The PTFE alone has a contact angle to purified water of approximately 110 degrees.

Co-deposition, Contact angle.
0%: 80 degrees (nickel-specific contact angle).
5%: 95 degrees.
10%: 102 degrees.
15%: 105 degrees.
20%: 107 degrees.
25%: 108 degrees.
30%: 109 degrees.

Contact angles in a co-deposition amount of not less than 20% is the almost equal to the contact angle of PTFE alone. The appearance ratio 20% of the PTFE particles to the nickel inner surface of the co-deposited material can provide significant water repellency substantially equivalent to PTFE alone. PTFE has a same tendency in terms of oil repellency against nonpolar liquids, as seen from polar liquid, such as water. Non-polar molecules, for example, hexadecane has a contact angle of 45 degrees on PTFE at room temperature. The appearance ratio 20% of the PTFE particles to the nickel inner surface of the co-deposited material can also provide a contact angle of 45 degrees for hexadecane. A covering film containing PTFE particles as co-deposition can provide the inner surface with a property of repelling an optical adhesive in contact with the surface of the covering film, irrespective of polarity and non-polarity of the adhesive. Borosilicate glass, which is not shown in FIG. 5, has a contact angle of 25 degrees to purified water (polar liquid).

Epoxy resins which can be used as optical adhesive have an epoxy group exhibiting a hydrophilic group (polar), and an epoxy backbone exhibiting a hydrophobic (non-polar). The contact angle of the epoxy resin, depending upon the resin composition thereof, is in the range of 45 degrees to 110 degrees on the PTFE. In the inner surface of the guide pipe, creeping-up of the adhesive due to the surface tension is proportional to the cosine of the contact angle thereto. For example, contact angles of not less than 90 degrees allows little occurrence of creeping up (creeping of the adhesive), and the creeping up may result in a failure that the guide member is fixed by the adhesive. In this light, the co-deposition content of the fluorinated organic compound in the coating film can be determined, and the co-deposition content is desirably 20% or more. The co-deposition content in this range allows the coating film to significantly reduce the occurrence of the adhesive creeping up the inner surface of the guide pipe.

The above usage of the guide pipe requires that the guide pipe with the inner size ("DIN" in FIG. 4) and the outer size ("DOUT" in FIG. 4) be fabricated within respective desired tolerances. Specifically, the positional-accuracy requirement for optical connection of single mode optical fibers requires the inner diameter of the guide pipe to be in the range of +0.0005 to −0.0005 mm. The method as described in the embodiments is one candidate to meet this requirement.

The required accuracy of optical coupling will be specifically described below. A single mode fiber (SMF) has a mode field diameter of for example, 7 to 8 micrometers. In the optical device that uses a single-mode fiber as the optical fiber 13 in the optical connecting part 11, preferably the position of the optical fiber 13 in the support portion 17c of the holder part 17 is in the range of −1.0 to +1.0 micrometers in positional accuracy such that an optical-coupling loss between the optical connecting part 11 and the optical waveguide or the optical element in the optical device optically coupled thereto can be reduced in the optical connection. In addition, preferably the position of the guide pipe 15 in the guide portion 17d is in the range of −1.0 to +1.0 micrometers in positional accuracy. A pipe-supporting groove for the guide pipe 15 is disposed in place of the support groove for the guide pin, and the guide pipe 15 is disposed in place of the guide pin in the pipe-supporting groove. As seen from the above, using the guide pipe 15 increase the number of parts. The inventor's estimate shows that the optical connecting part 11, which includes the guide pipe 15 and the guide portion 17d for guiding the pipe 15, can be downsized to be as small as a device using a guide pin and a pin-supporting groove, in spite of the increased number of parts, and that the optical connecting part 11 can reduce connection loss within the desired range in the above optical connection. Further, the optical connecting part 11, including the first member 19 and the second member 21 that are made of a material exhibiting brittle like glass material, can prevent force in inserting the guide pin into the guide pipe 15 from being exerted on a part(s) of the first member 19 and the second member 21 and/or directly on these members, so that the occurrence of cracks can be reduced in the first member 19 and/or the second member 21. Specifically, the guide portion 17d which supports the guide pipe 15 has, for example, a V-shaped groove, the wedge-shape of which is likely to cause cracks at the V-groove bottom.

Figures 6A, 6B:
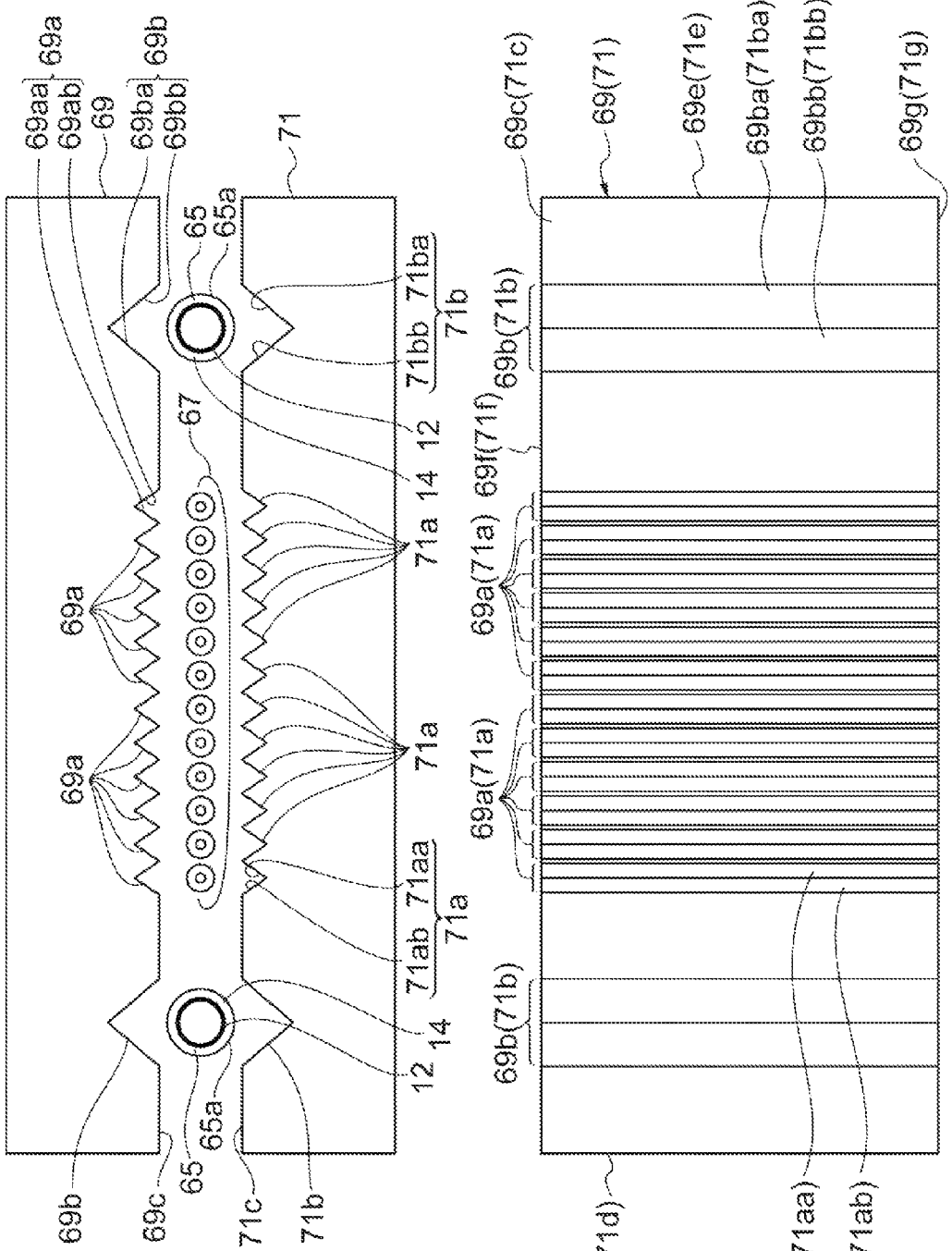
FIGS. 6A and 6B are schematic views showing a major step in a method for producing an optical connecting part according to the present embodiment.

With reference to FIGS. 6A, 6B, 7A, 7B, 8A, 8B and 9, a method of making an optical connection part will be described below. As shown in FIG. 6A, a metal pipe 65, an optical fiber part 67, and a first part 69 and a second part 71 for the holder are prepared. In the present embodiment, as already explained, the metal pipe 65 can be fabricated by, for example, electroforming. Specifically, the optical waveguide part is prepared as an optical fiber part 67. The optical fiber part 67 includes one or more optical fibers. The first part 69 and the second part 71, as shown in the plan view of FIG. 6B, have the same shape in the present embodiment. To facilitate understanding, a description will be given of the first part 69 below in place of both the first part 69 and the second part 71, and reference numbers in the parentheses at the back of reference numbers for the first part 69 indicate corresponding elements for the second part 71. The first part 69 (second part 71) has a first bonding surface 69c (71c) for receiving an adhesive. In the present embodiment, the first support groove 69a (71a) and the first guide groove 69b (71b) are provided on the first bonding surface 69c (71c). The first bonding surface 69c (71c) extends from one of a side 69*d* (71*d*) and another side 69*e* (71*e*) of the first part 69 (71) to the other, and reach a first end face 69*f* (71*f*) and a second end face 69*g* (71*g*).

The first support groove 69*a* (the second support groove 71*a*) extends from the first end face 69*f* (71*f*) to the second end face 69*g* (71*g*), and supports the optical fiber part 67. In order to enable the support, the first support groove 69*a* and the second support groove 71*a* include at least three faces in total preferably, and have four faces in total in the present embodiment. The first support groove 69*a* (71*a*) has a first side face 69*aa* (71*aa*) and a second side face 69*ab* (71*ab*), which are provided for supporting the optical fiber. Further, the first side face 69*aa* (71*aa*) and the second side face 69*ab* (71*ab*) are in contact with the side 65*a* of the optical fiber in the optical fiber part 67 placed in the first support groove 69*a* and the second support groove 71*a*, thereby supporting the optical fiber.

The first guide groove 69*b* (the second guide groove 71*b*) extend from the first end face 69*f* (71*f*) to the second end face 69*g* (71*g*) so as to support the metal pipe 65. The first guide groove 69*b* (71*b*) supports the metal pipe 65 placed in the first guide groove 69*b* (71*b*). In order to enable the support, the first guide groove 69*b* and the second guide groove 71*b* have at least three faces in total preferably, and have four faces in total in the present embodiment. More specifically, the first guide groove 69*b* (71*b*) has a first side 69*ba* (71*ba*) and a second side 69*bb* (71*bb*), which are provided for supporting a metal pipe 65. The first side 69*ba* (71*ba*) and the second side 69*bb* (71*bb*) are, in the present embodiment, in contact with the side of the metal pipe 65, thereby supporting the metal pipe 65.

The metal pipe 65, the optical fiber part 67, the first part 69 and the second part 71 are prepared. As shown in the front view of FIG. 6A, the metal pipe 65 and the optical fiber part 67 are positioned to one of the first part 69 and the second part 71, for example, the second part 71, and after the positioning of these members, the first part 69 is positioned thereto. Ends of the metal pipes 65 and the optical fiber part 67 thus positioned both are projected from the end faces of the first part 69 and second part 71 by respective values, which are in a range of about 0.02 to 0.3 mm.

As shown in the front view of FIG. 7A, the metal pipe 65 and the optical fiber part 67 are disposed between the first part 69 and the second part 71 in contact therewith. An adhesive 73 is applied thereto and the adhesive thus applied is disposed between the first bonding surface 69*c* of the first part 69 and the second bonding surface 71*c* of the second part 71. The minimum value of the distance between the first part 69 and the second part 71 is preferably about 1 to 2 micrometers, and the first part 69 and the second part 71 are not in contact with each other before and after fixed. The adhesive 73 may be coated over, for example, from the outside of one of the second guide grooves 71*b* on the second bonding surface 71*c* of the second part 71 across the second support grooves 71*a*, which are provided between the second guide grooves 71*b*, to the outside of the other of the second guide grooves 71*b*. The adhesive 73 is in contact with the side of the optical fiber part 67 located in the first support groove 69*a* and the second support groove 71*a*, and in contact with sides of the metal pipes 65 located in the second support groove 71*a* and the second guide groove 71*b*. The solidification of the adhesive 73 fixes the optical fiber part 67 and the metal pipe 65 to the first support groove 69*a* (71*a*) and the first guide groove 69*b* (71*b*), respectively. After the above positioning has been completed, the adhesive 73 is cured. This curing forms an assembly 75. The assembly 75 is an integrated body in which the metal pipe 65 and the optical fiber part 67 are sandwiched between the first part 69 and second part 71. For example, the adhesive 73 in liquid is supplied to a small space between the first part 69 and the second part 71, and the adhesive 73 thus supplied spreads over by capillary phenomenon. The adhesive 73 may include epoxy adhesive, such as, thermosetting or ultraviolet-curable epoxy adhesive. From the viewpoint of fixing, a preliminary fixation may be carried out with a brief period of UV curing, and heat curing after the preliminary fixing can secure them.

FIG. 7B is a cross sectional view taken along VIIb-VIIb line shown in FIG. 7A. When the metal pipe 65 and the optical fiber part 67 are positioned to, for example, the second part 71, each of the metal pipe 65 and the optical fiber part 67 has, a first surplus extending outward from the first end face 71*f* of the second part 71, and a second surplus extending outward from the second end face 71*g* of the second part 71.

As shown in FIG. 8A, the end face of the assembly 75 is polished with the polishing member 77 to provide the assembly 75 with a polished face. This polishing can form a second end face 17*b* for the optical connecting part. FIG. 8B is a cross sectional view taken along the VIIIb-VIIIb line shown in FIG. 8A. In the present embodiment, the end of the optical fiber part 67 and the end of the metal pipe 65 are located at the second end face 17*b*, and these ends of the metal pipe 65 and the optical fiber part 67 are arranged on the second end face 17*b*. The metal pipe 65 has a polished face at the end thereof, and the optical fiber part 67 also has a polished face at the end thereof.

In the method of forming a stub structure, subsequently, as shown in the part (a) of FIG. 9, the other end face of the assembly 75 is also polished with the polishing member 77 to provide the assembly 75 with another polished face. This polishing can form a first end face 17*a* for the optical connection part 11. FIG. 9 includes the part (b) showing a cross sectional view taken along the IXb-IXb line in the part (a) of FIG. 9. In the present embodiment, the twice polishing removes both original ends of the optical fiber part 67 and both original ends of the metal pipe 65, so that a polished end of the optical fiber 13 and a polished end of the guide pipe 15 are located at each of the first end face 17*a* and the second end face 17*b*. The polishing results in the formation of the end and the other end of the optical fiber 13 and the end and the other end of the guide pipe 15.

In the stub structure, the end of the optical fiber 13 and the end of the guide pipe 15 are arranged on the first end face 17*a*, and the other end of the optical fiber 13 and the other end of the guide pipe 15 are arranged aligned on the second end surface 17*b*. The first end face 17*a* of the holder product (the polished surface) extends so as to surrounds the polished faces of the guide pipes 15 and the polished faces of the optical fibers 13. In the present embodiment, the guide pipes 15 and the optical fibers 13 are arranged along a first reference plane R1. The first end face 17*a* extends along a second reference plane R2 inclined with respect to a plane perpendicular to the first reference plane R1, and the second end face 17*b* extends along a third reference plane R3 perpendicular to the first reference plane R1, and the inclination angle of the first end face 17*a* can be, for example, about 8 degrees.

The polishing for forming the first end face 17*a* has been carried out, and major processes in the method for fabricating the optical connecting part are completed. The method for forming a stub structure is provided above, and in the method for forming a pigtail structure, one of the end faces, not both, is polished to leave the pigtail.

Figure 10:
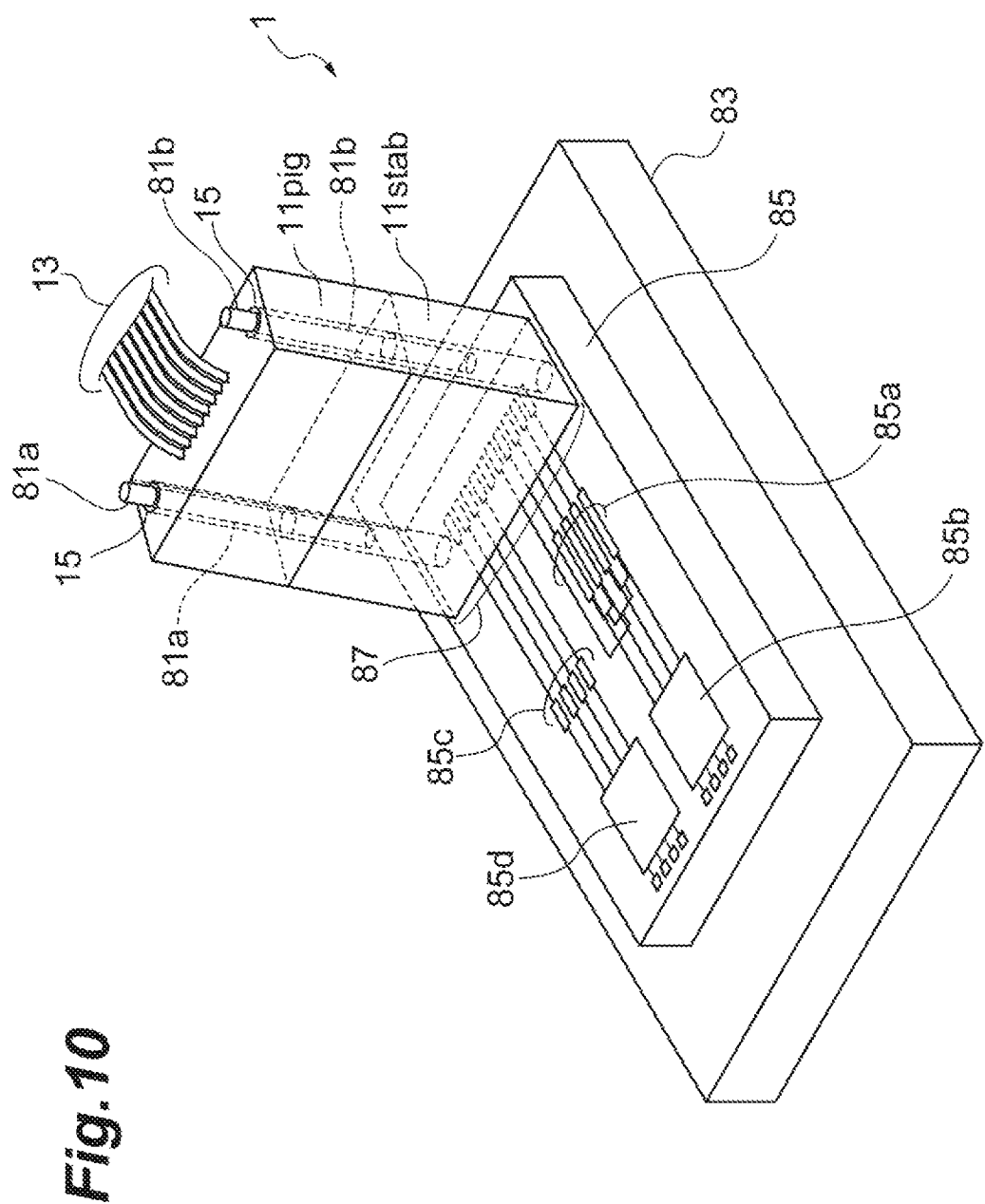
FIG. 10 is a schematic view showing an optical processing apparatus including the optical connecting part according to the present embodiment.

FIG. 10 shows an optical processing device according to the present embodiment to which the optical connecting part 11 can be applied. In the optical processing device 1 shown therein, the optical connecting part 11pig and the optical connecting part 11stab are connected to the semiconductor optical device, such as a silicon photonics device 85. The optical connecting part 11stab comprises, for example, a stub-structure device shown in FIG. 2A, and the optical connecting part 11pig may comprise, for example, a pigtail-structure device shown in FIG. 2B. The silicon photonics device 85 to be optically coupled integrates an optical coupling element, an optical element, and a circuit element monolithically. Specifically, the silicon photonics device 85 includes an optical modulator 85a for optical transmission, a signal processing circuit 85b associated therewith, a light receiving element 85c for optical reception, and a signal processing circuit 85d associated therewith, and further includes an optical coupling element (e.g. grating couplers) to be optically coupled to an external device, such as the optical connecting part 11. In the silicon photonics devices 85, the grating couplers are connected to the modulator 85a and the light receiving element 85c via the optical waveguide. The modulator 85a is connected to the signal processing circuit 85b via a metal wiring layer, and the light receiving element 85c is connected to the signal processing circuit 85d via a metal wiring layer. The modulator 85a and the light receiving element 85c each serve as an optical element which processes light beams associated with the optical coupling element. The signal processing circuit 85b and the signal processing circuit 85d each serve as a circuit element that processes an electrical signal associated with the optical element.

The optical connecting part 11stab is attached to the silicon photonics device 85 so as to be optically coupled to the grating couplers in the silicon photonics element 85. Active alignment can be performed using the optical connecting part 11pig for the optical coupling. The optical connecting part 11pig is optically coupled to the optical connecting part 11stab. Guide pins 81a and 81b are used for alignment in the coupling, and disposed in the guide pipes 15 of the optical connecting part 11pig and the guide pipes 15 of the optical connecting part 11stab. In the present embodiment, ends of the guide pins 81a and 81b are located in the axial midway of the guide pipes 15 of the optical connecting part 11stab. The active alignment process is carried out as follows: light is introduced into the silicon photonics element 85 via the optical connecting part 11pig and the optical connecting part 11stab; the optical connecting parts 11pig receive light from the silicon photonics device 85; and optical alignment is performed on the basis of the intensity of light thus received. Prior to the optical alignment, adhesive may be supplied to the top surface of the silicon photonics device 85 on which the optical connecting part 11stab is to be optically coupled with the silicon photonics device 85. The adhesive may include, for example, an optical adhesive having both UV-curable and thermosetting agents. The optical alignment can be performed on the optical adhesive on the top of the silicon photonics device. Upon obtaining the desired intensity of the light, the optical adhesive is irradiated with UV-light, and the irradiation solidifies the adhesive to perform the preliminary fixing of the optical connecting part 11stab to the silicon photonics device 85. After the solidification for the preliminary fixing, the optical connecting part 11pig for aligning is removed therefrom. After the removal, heat treatment is applied to the adhesive in a process for fully curing the adhesive thus preliminarily-cured. The heat-treatment of the adhesive for the full curing allows the adhesive member 87 solidified for the full curing to firmly fix the optical connecting part 11stab to the silicon photonics device 85. The guide pipe 15 with oil repellency in the optical connecting part 11stab according to the present embodiment allows the adhesive supplied thereto to hardly creep up by capillarity action into the guide pipe 15 of a small inner diameter, and hardly creep up by capillarity action between the guide pipes 15 and the guide pins 81a and 81b. The less occurrence of creeping up the adhesive allows the preliminary UV process to hardly fix the guide pins 81a and 81b to the respective guide pipes 15. In addition, the optical connecting part 11pig having the guide pipe 15 of oil repellency has advantages similar to the above, so that the guide pipe 15 with oil repellency in the optical connecting part 11pig allows the adhesive to hardly creep up by capillarity action between the guide pipes 15 and the guide pins 81a and 81b.

Figure 11A:
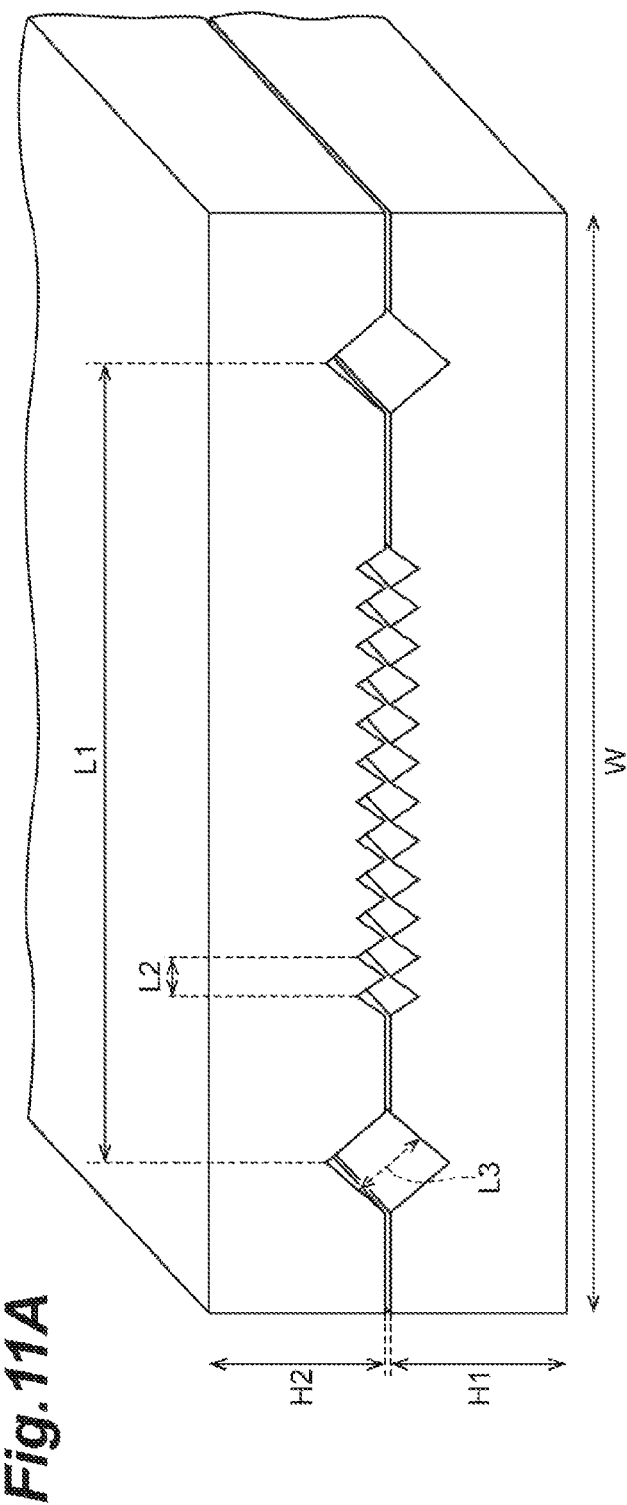
FIGS. 11A, 11B and 11C are views showing an exemplary optical connecting part including an optical fiber and a guide pipe according to the present embodiment.
Figure 11C:
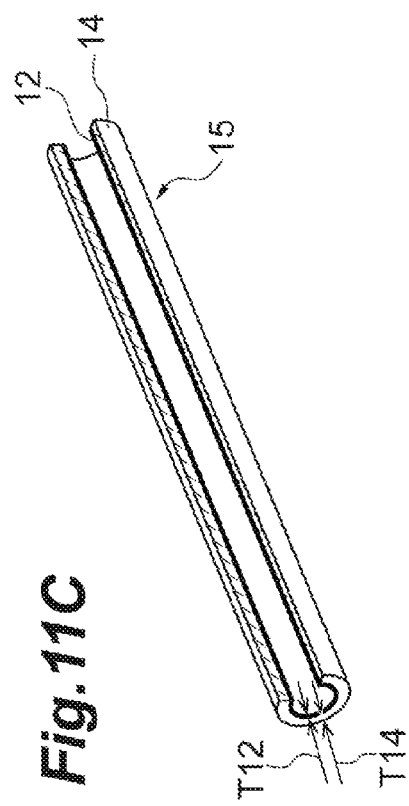
Figure 11B:
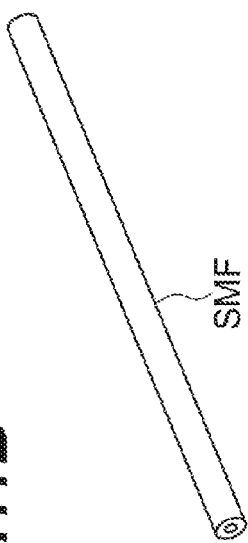

FIGS. 11A, 11B and 11C are views each showing components of an exemplary optical connecting part according to the present embodiment. FIG. 11A shows a glass component (e.g., borosilicate glass) for the first member 19 and the second member 21 of the holder part 17. FIG. 11B shows a single mode optical fiber SMF for the optical fiber 13, and the diameter of the single-mode optical fiber SMF is 0.125 mm. FIG. 11C shows the guide pipe 15. In addition, these drawings show an exemplary structure with the following dimensions connectable to an MT-type connector.
Width of the holder W: 7 mm.
Holder of the depth: 3 mm.
The height H1 of the first member of the holder: 1.2 mm.
The height H2 of the second member of the holder: 1.2 mm.
Center-to-center spacing L1 of the guide portion for the guide pipe: 4.6 mm (tolerance −0.001 to +0.001 mm).
Center-to-center spacing L2 of the support for the optical fiber: 0.25 mm (tolerance −0.001 to +0.001 mm).
The pore size L3 of the guide portion for the guide pipe: 0.9 mm (tolerance: −0.001 to +0.001 mm).
The outer diameter of the guide pipe: 0.8995 mm (tolerance: −0.0005 to +0.0005 mm).
The outer diameter of the guide pin to be inserted in the guide pipe: 0.699 mm.
The top angle of the V groove for the optical fiber: 70 degrees.
The top angle of the V groove for the guide pipe: 70 degrees.
The length between the top of the two V-grooves for the guide pipe: 4.6 mm.
The thickness T12 of the coating film of the guide pipe in which the particles are dispersed in the co-deposited material: 1 micrometer.
The thickness T14 of the nickel base of the guide pipe: 99 micrometers.

As seen from the above, the optical connecting part 11 has a small size. The guide portion and the guide pipe in the optical connecting part 11 have small lengths, and the guide pipe 15 also has a small inner diameter. These small-sized parts need high precision in the inner diameter and the outer shapes, and make a space between the guide pipe 15 and the guide pin small. What is important in the optical connecting part 11 is to reduce the occurrence of the creeping-up of the adhesive into the guide pipes and the small opening between the guide pipe and the guide pin by capillary action.

Having described and illustrated the principle of the invention in a preferred embodiment thereof, it is appreciated by those having skill in the art that the invention can be modified in arrangement and detail without departing from such principles. We therefore claim all modifications and variations coming within the spirit and scope of the following claims.

What is claimed is:

1. An optical processing apparatus including:
an optical connecting part including a holder and a coating, the holder having an end face for optical connection, one or more optical waveguides, a holding part supporting the one or more optical waveguides, a pipe-shaped base supported by the holding part, and a through-hole in the pipe-shaped base, the one or more optical waveguides each having a portion extending from the end face in a direction of a first axis, the through-hole extending from the end face in the direction of the first axis, the coating being disposed on an inner surface of the through-hole to form a guide hole, the coating having oil repellency, and being composed of a mixture of a metal and an organic compound dispersed in the metal;
a semiconductor optical device optically coupled to the optical connecting part, the semiconductor optical device including a silicon-photonics device; and
an adhesive member bonding the optical connecting part to the semiconductor optical device, the adhesive member being in direct contact with the optical waveguides, the end face of the holder, the pipe-shaped base and the coating, the adhesive member being in the through-hole, wherein
the silicon-photonics device integrates an optical coupling element, an optical element, and a circuit element,
the optical element processes light associated with the optical coupling element, and
the circuit element processes an electrical signal associated with the optical element.

2. A method for fabricating an optical connecting part, the method including steps of:
preparing a guide part including a guide pipe having a guide hole with a coating disposed on an inner surface of the guide hole, the coating having oil repellency, the guide hole extending from one end to another end of the guide part;
preparing a first member and a second member for a holder, and an optical waveguide part; and
forming a holder part including the first member, the second member, and the optical waveguide part with the optical waveguide part disposed between the first member and the second member,
wherein the preparing a guide part includes steps of:
forming a composite plated layer on a metal side face of a core member by plating, the composite plated layer including a mixture containing a metal and a fluorine-containing organic compound dispersed in the metal;
after forming the composite plated layer, forming a metal plated layer on the composite plated layer to form a plated product; and
removing the core member from the plated product to provide the guide pipe.

3. The method according to claim 2, further including a step of cutting the core member, the composite plated layer and the metal plated layer together to form the plated product.

* * * * *